April 12, 1966  K. G. KREUTER ETAL  3,245,426
PNEUMATIC SELECTOR RELAY
Filed Nov. 13, 1962  2 Sheets-Sheet 1

INVENTORS
KENNETH G. KREUTER
KLAUS P. MUELLER
BY
Browne, Schuyler, & Beveridge
ATTORNEYS.

April 12, 1966    K. G. KREUTER ETAL    3,245,426
PNEUMATIC SELECTOR RELAY
Filed Nov. 13, 1962    2 Sheets-Sheet 2

INVENTORS
KENNETH G. KREUTER
KLAUS P. MUELLER
BY Browne, Schuyler, and Beveridge
ATTORNEYS.

3,245,426
PNEUMATIC SELECTOR RELAY
Kenneth G. Kreuter and Klaus P. Mueller, Goshen, Ind., assignors to Robertshaw Controls Company, Richmond, Va., a corporation of Delaware
Filed Nov. 13, 1962, Ser. No. 236,828
9 Claims. (Cl. 137—112)

This invention is related to high pressure selector relays particularly for use in pneumatic control systems.

Pneumatic control systems are commonly employed in industrial process control systems, heating systems, air conditioning systems and the like for controlling the position of a controlling element such as a valve, in accordance with variations in one or more control conditions such as temperature, humidity or pressure.

As the controlled conditions vary, input pressure signals are introduced to a relay device which transmits to the controlling element an output pressure to change the position of the controlling element in accordance with variations in the condition as measured by variable input signals.

Frequently required in such systems is a relay which selects the higher of two input pressure signals for transmission as an output pressure so that a particular valve or other controlling element is always under the control of the higher pressure. In some cases, an additional requirement is that the output pressure always be maintained above a certain minimum pressure.

In high pressure selector relays, two inlets conduct the pressure to a single outlet and some means is provided to connect the high pressure inlet with the outlet while simultaneously disconnecting the low pressure inlet from the outlet. This has been accomplished by the employment of complicated valves for controlling the inlets and by machining a complex system of passages in the walls of the relay casing. Such relays are relatively expensive to manufacture and the numerous passages are highly susceptible to becoming clogged or obstructed by foreign matter.

An object of this invention is to provide a selector relay having a minimum number of passages in which the outlet is always in communication with the inlet having the higher pressure.

Another object is to provide a pneumatic relay which transmits an output pressure which is the higher of two input pressures with one of the input pressures being maintained at a constant minimum value.

Another object is to provide a high pressure selector relay which is inexpensive to manufacture and yet has greater reliability in operation than presently manufactured high pressure selector relays.

The foregoing and other objects are attained by provision of a casing having a chamber with two inlets and a single outlet. Positioned between the inlets is a flexible diaphragm which moves in response to pressure differentials into sealing engagement with the inlet having the lower pressure and opens the inlet having the higher pressure.

In order to transmit the higher pressure from the inlet on the opposite side of the diaphragm from the outlet, the diaphragm is formed with a plurality of perforations, preferably in the form of slits. When the diaphragm is distended by the fluid pressure, the slits open to permit fluid to flow directly through the diaphragm.

In a modified form of the invention, the output pressure of the relay is always maintained above a minimum value. One of the inlets is connected with a minimum pressure control chamber having a flexible wall. Pressure is supplied to the control chamber through a port connected with a source of compressed air at a constant pressure, and which is controlled by a supply valve. Carried by the flexible wall is an actuating stem having an exhaust passage. Movement of the flexible wall in one direction closes the exhaust passage against the supply valve, and the supply valve is opened by the end of the actuating stem to admit pressure to the control chamber. Movement of the flexible wall in the opposite direction permits the supply valve to be seated shutting off the flow into the control chamber, and the exhaust passage connects the control chamber with ambient atmosphere.

For determining pressure at which the output pressure is to be maintained, an adjustable spring is connected with the valve actuating stem and biases the stem in a direction to open the supply valve. Accordingly, the supply valve will remain open until the pressure in the control chamber exceeds the biasing force on the valve determined by adjustment of the spring. Therefore one of the inlets will always be supplied by pressure, the value of which is determined by adjustment of the spring.

Other objects and advantages will become apparent from the following description taken in connection with the accompanying drawings in which.

Figure 2:
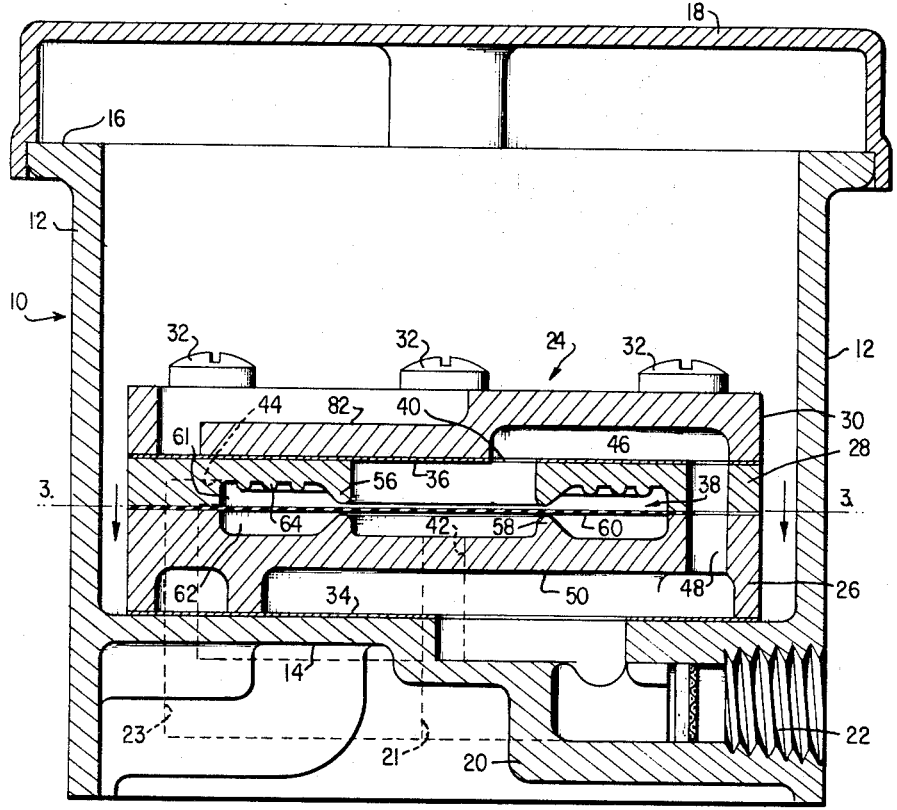
FIG. 2 is a sectional view taken on line 2—2 of FIG. 1.
Figure 1:
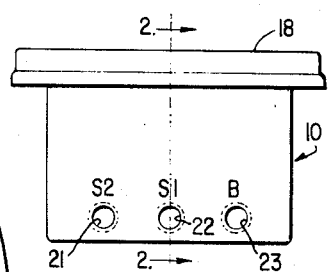
FIG. 1 is a front elevation view of a pneumatic relay embodying the invention in its preferred form.

With reference to FIGS. 1 and 2, a housing 10 is illustrated having side walls 12 and a bottom wall 14. Provided at the upper edge of the side walls is a peripheral flange 16 which supports a cover member 18 which may be secured to flange 16 in any conventional manner.

Integrally formed in the lower side of bottom wall 14 is a boss 20 having three internally threaded ports 21, 22 and 23 (FIG. 1). Ports 21 and 23 are indicated schematically by broken lines in FIG. 2. Ports 21 and 22 are connected respectively with variable signal pressures S2 and S1, while port 23 transmits an outlet or branch pressure B.

Mounted in the housing on bottom wall 14 is a casing 24 formed of three sections 26, 28 and 30 which are secured to each other and to bottom wall 14 by conventional screws 32. Resilient gasket members 34 and 36 are clamped between bottom wall 14 and between sections 28 and 30 to provide a fluid tight seal between the members. Casing sections 26 and 28 cooperate to form a compartment 38 having an inlet port 40 for connection with signal pressure S1, an inlet port 42 for connection with signal pressure S2, and an outlet port 44 for transmitting output pressure B from compartment 38 through port 23. Inlet port 40 communicates with port 22 through a channel 46 formed in casing section 30 which in turn communicates with a passage 48 extending through sections 26 and 30. Passage 48 communicates with a channel 50 formed on the lower side of casing section 26 which in turn communicates with port 22.

Inlet port 42 communicates with port 21, and outlet port 44 is connected with port 23 as indicated by broken lines in FIG. 2. Projecting into compartment 38 from the lower side of casing section 28 is an annular boss 56 which surrounds inlet port 48. Inlet port 42 is similarly encircled by an annular boss 58 formed in the lower wall of compartment 38.

Figure 3:
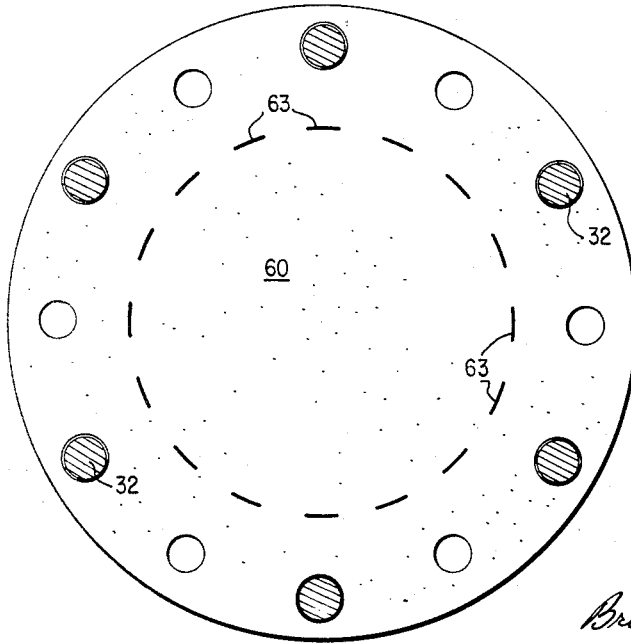
FIG. 3 is a plan view of the perforated diaphragm taken on line 3—3 of FIG. 2.

Secured at its periphery between casing sections 26 and 28 is a flexible diaphragm 60 which divides compartment 38 into a pair of chambers 61 and 62. With reference to FIG. 3, diaphragm 60 is provided with a plurality of perforations or slits 63 for a purpose to be described below. Slits 63 are disposed on a circle having a diameter such that the slits lie outside the area circumscribed by bosses 56 and 58.

Figure 4:
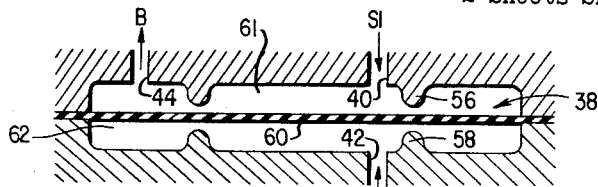
FIGS. 4, 5 and 6 are schematic views illustrating the operation of the perforated diaphragm.
Figure 5:
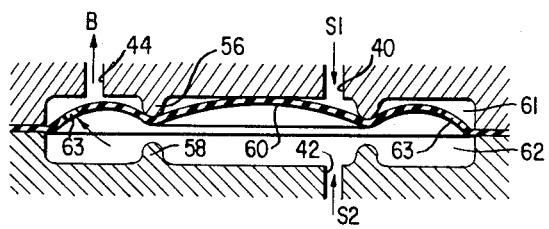
Figure 6:
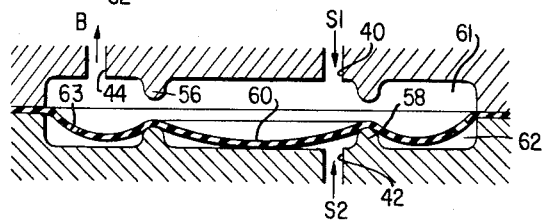

Operation of the relay can best be understood by referring to FIGS. 4, 5 and 6. In FIG. 4, when signal pressures S1 and S2 are equal, diaphragm 60 is disposed intermediate bosses 56 and 58 and outlet port 44 is in direct communication with inlet port 40. In FIG. 5, signal pressure S2 exceeds signal pressure S1 and the differential pressure acting on diaphragm 60 causes it to move upwardly into sealing engagement with boss 56 and disconnect port 40 from port 44. Distension of diaphragm 60 into the position of FIG. 5 causes slits 63 to open, and the higher signal pressure S2 is transmitted to port 44 through the slits.

Conversely, when signal pressure S1 exceeds signal pressure S2, diaphragm 60 assumes the position of FIG. 6 against boss 58 and shuts off communication between inlet port 42 and chamber 62. Since slits 63 are located outside of the periphery of boss 58, the output pressure B is the same as signal pressure S1.

A series of serrations or depressions 64 may be formed in the upper wall of chamber 61 (FIG. 2) to prevent the slits from pressing against the upper wall of the chamber and reducing the flow.

Figure 7:
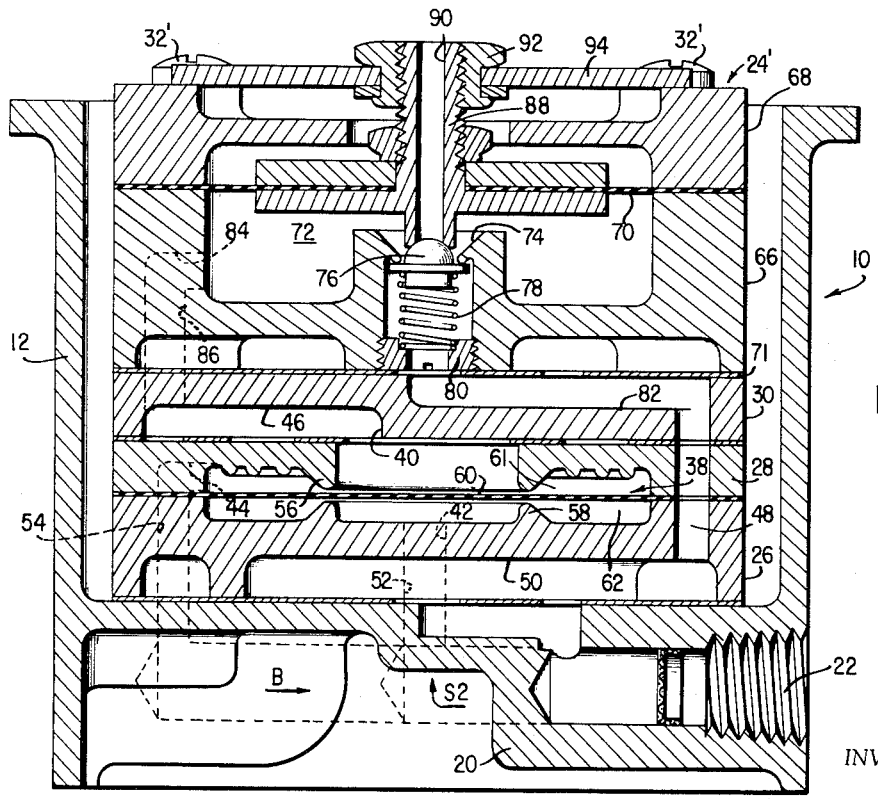
FIG. 7 is a sectional view of a modified form of the invention embodied in a minimum pressure relay.

FIG. 7 illustrates a modified form of the invention in which the output pressure B is maintained at a selected minimum value. Mounted in housing 10 is a casing 24' made up of sections 26, 28, 30, 66 and 68. Secured at its periphery between sections 66 and 68 is a flexible diaphragm 70 which forms with section 66, a minimum pressure control chamber 72. Mounted between sections 30 and 66 is a gasket 71 to provide a fluid tight seal between the members. Section 30 is rotated 180° from its position in FIG. 1 so that a channel 82 formed in the upper side of section 30 communicates with passage 48.

Section 66 is provided with a supply port 74 controlled by a supply valve 76. Supply valve 76 is biased to a closed position by a spring 78 which is seated on an apertured, threaded spring seat member 80. Pressure is transmitted from control chamber 72 through an outlet port 84 which communicates with chamber 61 through a passage 86 and channel 46.

Carried by diaphragm 70 is a valve actuating stem 88 having an exhaust passage 90. Diaphragm 70 has its central portion clamped between a flange of stem 88 and a washer. Stem 88 is threadedly connected at its upper end with an adjusting nut 92 rotatably mounted on a flat range spring 94. Rotation of nut 92 adjusts the vertical position of stem 88 relative to supply valve 76.

Increases in pressure in chamber 72 act on diaphragm 70 to exert an upward force on stem 88 in opposition to the downward force of spring 94. When the pressure in chamber 72 is sufficient to overcome spring 94 and move the lower end of exhaust passage 90 out of engagement with supply valve 76, chamber 72 is exhausted to atmosphere. Therefore, by properly adjusting nut 92 such that valve 76 is open against spring 78 by the lower end of valve actuating stem 88, the pressure to be maintained in chamber 72 can be controlled at a selected value.

If it is desired that the output pressure of the relay be maintained at a minimum of 2 p.s.i. for example, nut 92 is adjusted so that a pressure of 2 p.s.i. in control chamber 72 will just be sufficient to balance the forces acting on stem 88 so that the lower end of exhaust passage 90 will be closed against supply valve 76, and supply port 74 will be closed by supply valve 76. Any increase above 2 p.s.i. will cause stem 88 to move out of engagement with supply valve 76 and release the excess pressure through port 90. As long as the pressure in chamber 72 is less than 2 p.s.i., valve 76 will be held open by the force of spring 94 acting through stem 88.

In operation, port 22 is connected with a source of compressed air, or other fluid, at a constant pressure, and port 21 is connected with a variable signal pressure S2. Range spring 94 is adjusted to maintain a selected minimum pressure in control chamber 72. When the variable signal pressure S2 is greater than the pressure in control chamber 72, output pressure B will be the same as the signal pressure S2. Should the signal pressure S2 then fall to a value less than the minimum pressure of control chamber 72, output pressure B will then be the minimum pressure detained by control chamber 72. Thus the output pressure B will always be maintained at a value equal to or greater than the minimum pressure as determined by range spring 94.

While specific embodiments have been illustrated and described, it will be understood that the invention is not limited to the precise construction illustrated and that various alterations and modifications in the structure and arrangement of parts is possible without departing from the scope of the invention.

What is claimed is:

1. A pneumatic relay comprising;
a pair of chambers,
a first inlet and an outlet in one chamber,
a second inlet in the other chamber,
a flexible diaphragm mounted between the chambers for movement in response to fluid pressure differentials between the chambers into sealing engagement with the inlet having the lower pressure,
and at least one slit in the diaphragm operative, when the first inlet is sealed by the diaphragm, to permit fluid flow from the second inlet only to the outlet.

2. A pneumatic relay comprising;
a pair of chambers,
a first inlet and an outlet in one chamber,
a second inlet in the other chamber,
an annular boss surrounding each inlet,
a flexible diaphragm mounted between the chambers for movement into sealing engagement with the boss at the inlet having the lower pressure,
and at least one normally closed perforation in the diaphragm located externally of the area of the diaphragm bounded by the annular bosses operable upon distension of the diaphragm to permit fluid flow therethrough and connect the outlet with the second inlet only when the pressure at the first inlet is the lower of the two inlet pressures.

3. A pneumatic relay comprising;
a pair of chambers each having an inlet port,
an outlet port in one of the chambers,
a flexible diaphragm mounted between the chambers for movement into sealing engagement with the inlet having the lower pressure in response to fluid pressure differentials acting on the diaphragm,
and a plurality of slits in the diaphragm distensible when the diaphragm moves into sealing engagement with one of the inlet ports to permit fluid flow from the other inlet to the outlet.

4. A pneumatic relay comprising;
a compartment having end walls,
a first inlet and an outlet in one of the end walls,
a second inlet in the other end wall,
a flexible diaphragm mounted between the end walls for movement in response to differential fluid pressures to seal the inlet having the lower pressure,
and a ring of normally closed slits formed in the diaphragm distensible upon flexing of the diaphragm in response to pressure differentials to connect the second inlet with the outlet when the first inlet is sealed.

5. A pneumatic relay as defined in claim 4 including an annular boss on the end walls surrounding each inlet having a diameter less than the diameter of the ring of slits and concentrically disposed in the compartment relative to the ring of slits.

6. A pneumatic relay as defined in claim 4 including minimum pressure control mechanism connected with one of the inlets adjustable to maintain a minimum selected pressure at said one inlet.

7. A pneumatic relay comprising;
a minimum pressure control chamber having a flexible wall,
a supply port in the control chamber connected with a source of fluid at a constant pressure,
a supply valve moveably mounted in the supply port for controlling flow into the control chamber,
means biasing the supply valve to close the supply port,
a valve actuating stem carried by the flexible wall,
an exhaust passage in the valve actuating stem communicating at one end with the control chamber and at the other end with ambient atmosphere,
said valve actuating stem being moveable in one direction to close said one end of the exhaust passage against the supply valve, and moveable in the opposite direction to permit the supply valve to close and connect the control chamber with ambient atmosphere,
an adjustable spring biasing the valve actuating stem in said one direction to maintain a minimum pressure in the control chamber determined by the biasing force of the adjustable spring,
an output chamber having a first inlet connected with a variable signal pressure and a second inlet connected with the control chamber,
an outlet in the output chamber,
a flexible diaphragm mounted at its periphery in the output chamber and separating one of the inlets from the outlet and the other inlet for movement in response to pressure differentials into sealing engagement with the inlet having the lower pressure,
and a plurality of slits in the diaphragm permitting fluid flow from said one inlet only to the outlet when the other inlet has the lower pressure.

8. A pneumatic relay comprising;
a pair of chambers,
a first inlet and an outlet in one of the chambers,
a second inlet in the other of the chambers,
a pressure responsive flexible wall separating the chambers having an impervious central portion concentric with and slightly larger than the inlets operable upon movement of the flexible wall in response to pressure differentials between the chambers to seal the inlet having the lower pressure,
said central portion of the flexible wall being surrounded by a portion normally impermeable when the flexible wall is unstressed with substantially equal pressures in said chambers,
said portion surrounding the central portion stretching upon movement of the central portion in response to pressure differentials to provide a plurality of openings permitting the passage of fluid to flow through the diaphragm.

9. In a pneumatic system including first and second sources of pressure and a pressure chamber having first and second inlets, respectively, in communication with said sources and boss means defining said inlets, means selectively preventing the flow of pressure from that one of said sources supplying the lowest magnitude of pressure into said chamber comprising: a flexible diaphragm in said chamber, an impervious portion in said diaphragm in common registry with said first and second inlets selectively engaging said boss means defining that one of said inlets carrying said pressure of lowest magnitude; and slit means formed in said diaphragm externally of said inlets and said boss means, said slit means being closed in the absence of a pressure differential across said diaphragm and being open in the presence of a pressure differential across said diaphragm which exceeds a predetermined minimum value, effecting the selective action of said diaphragm in response to pressure differentials thereacross of less than said predetermined minimum as well as pressure differentials in excess of said predetermined minimum.

References Cited by the Examiner
UNITED STATES PATENTS

| | | | |
|---|---|---|---|
| 2,416,091 | 2/1947 | Fitch | 137—112 |
| 2,707,481 | 5/1955 | McPherson | 137—218 |
| 2,778,373 | 1/1957 | Jaquith | 137—112 |
| 2,858,840 | 11/1958 | Wright | 137—107 X |
| 2,897,835 | 8/1959 | Philippe | 137—218 |
| 3,008,481 | 11/1961 | Matheson | 137—112 |

ISADOR WEIL, *Primary Examiner.*

CLARENCE R. GORDON, *Examiner.*